April 11, 1961 H. BREIMER 2,979,560

RECEIVER FOR COLOR TELEVISION SIGNALS WITH SLOPE-RELATED SYNCHRONOUS DETECTORS

Filed Nov. 10, 1959

INVENTOR

HENDRIK BREIMER

BY

Frank R. Jifoni

AGENT

United States Patent Office 2,979,560
Patented Apr. 11, 1961

2,979,560

RECEIVER FOR COLOR TELEVISION SIGNALS WITH SLOPE-RELATED SYNCHRONOUS DETECTORS

Hendrik Breimer, Eindhoven, Netherlands, assignor to North American Philips Company, Inc., New York, N.Y., a corporation of Delaware Filed Nov. 10, 1959, Ser. No. 852,122

Claims priority, application Netherlands Nov. 28, 1958

3 Claims. (Cl. 178—5.4)

The invention relates to receivers for a transmission system for color television signals, in which the transmitted signal has a signal component, which mainly relates to the brightness of a scene, and a signal component comprising an auxiliary carrier wave, modulated in quadrature by two signals of different bandwidths, each of which is built up from a definite combination of signals which relate to the respective color component of the scene.

In a known system of the above kind, a first component—the luminance signal—comprises a combination of three signals, the first of which relates to the green light components of the scene, the second to the red light components of that scene and the third to the blue light components of that scene.

The second component comprises an auxiliary carrier wave, modulated in quadrature by two signals, which are likewise combinations of the three signals relating to the green, red and blue light components respectively of the scene, which combinations are mutually different and at the same time differ from the combination of which the luminance signal consists.

Of the two signals modulated on the auxiliary carrier wave in the known system, the signal with smaller bandwidth, the so-called Q-signal, is limited to approximately 500 kc./s., and the signal with larger bandwidth, the so-called I-signal, is limited to approximately 1500 kc./s. The quadrature component of the auxiliary carrier wave, which is modulated by the Q-signal, is modulated to 500 kc./s. by a double side-band; the quadrature component, which is modulated by the I-signal, is modulated to 500 kc./s. by a double side-band, and by a single side-band from 500 kc./s. to 1500 kc./s.

Receivers for the above system operate as follows: After detection, if any, if the transmission has occurred by wireless, the luminance signal and the auxiliary carrier wave modulated in quadrature are available in the receiver. By means of a process which is usually indicated as synchronous detection, the I- and the Q-signal are derived from this modulated auxiliary carrier wave. From the luminance signal and the I- and the Q-signal the three color signals to be supplied to the reproduction device are finally formed by means of matrix networks.

The output circuit of the demodulators, used in the synchronous detection, procedure comprises low-pass filters which restrict the respective output signals to the required value in bandwidth. The low-pass filter in the output circuit of the demodulator for the I-signal limits this signal to 1500 kc./s. and the low-pass filter in the output circuit of the demodulator for the Q-signal limits this signal to 500 kc./s.

In practice, both low-pass filters have an attenuation characteristic which shows a comparatively steep slope in the neighbourhood of the relative cut-off frequency. By slope is to be understood here the number of decibels by which the attenuation is increased per octave in the neighbourhood of the cut-off frequency. The slope of the filter for the I-signal is comparatively steep, in order to prevent that the I-signal is disturbed by demodulation of the auxiliary carrier wave occurring in the output of the demodulators. The slope of the filter for the Q-signal is chosen comparatively steep in order to suppress the demodulation products of the quadrature component occurring in the output of the demodulator for the Q-signal, which component is modulated by the I-signal, and which products lie between 500 kc./s. and 1500 kc./s. in the chosen example. Naturally, the demodulation products of this quadrature component in the output of the demodulator for the Q-signal, lying between 0 and 500 kc./s., are zero.

Since the bandwidth of the filter for the I-signal is approximately three times as large as the bandwidth of the filter for the Q-signal, the delay brought about by the relative filter in the I-signal is approximately three times as small as the delay brought about by the relative filter in the Q-signal. In order to compensate this difference in delay, the transmission channel for the I-signal in the known receivers comprises a delay line.

The object of the invention is to avoid the use of such a delay line in the transmission channel for the signal with larger bandwidth.

Therefore, the receiver according to the invention is characterized in that the ratio between the slope of the filter which is in the output circuit of the demodulator for the signal with the smaller bandwidth, in the neighbourhood of the cut-off frequency of this filter, and the slope of the filter which is in the output circuit of the demodulator for the signal with the larger bandwidth, in the neighbourhood of the cut-off frequency of this latter filter, approximately equals the ratio between the cut-off frequency of the former filter and the cut-off frequency of the latter filter.

By cut-off frequency is to be understood here mostly that frequency at which the attenuation is three decibels larger than the attenuation in the flat part of a filter.

The invention is based on the understanding that, by suitable choice of the slope of the filter for the signal with smaller bandwidth, the delay brought about by this filter can be made approximately equal to the delay brought about by the filter for the signal with larger bandwidth, and at the same time that the former filter may have a considerably smaller slope in the neighbourhood of the cut-off frequency than the filter for the signal with larger bandwidth without this giving rise to a disturbing decrease in quality of the reproduced picture.

In order that the invention may be readily carried into effect, it will now be described in greater detail with reference to the figures shown in the drawing, in which.

Figures 1, 2, 3:
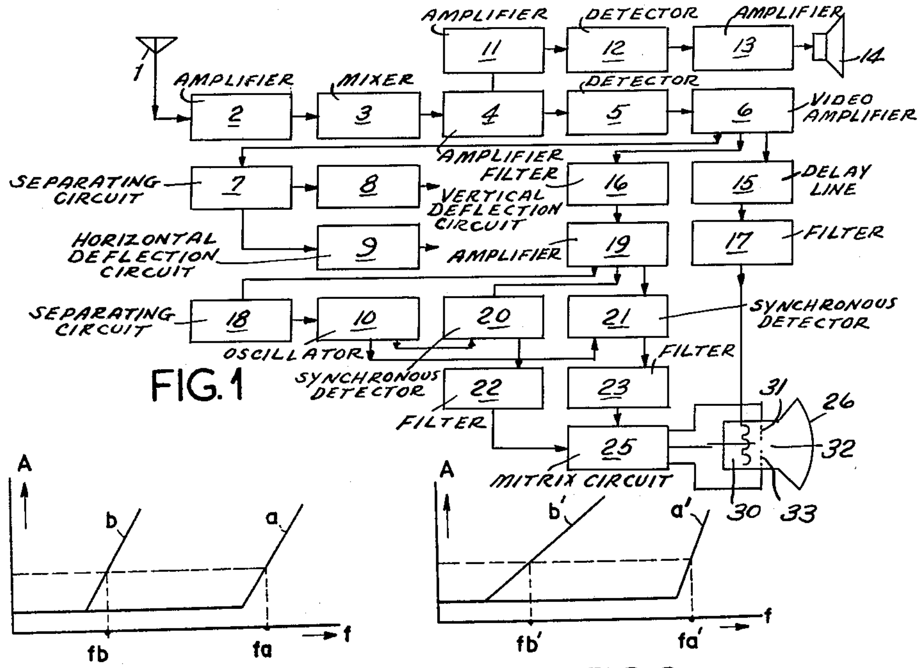
Fig. 1 is an embodiment of a receiver according to the invention.
Fig. 2 shows the attenuation characteristics of filters in the known receivers.
Figs. 3 and 4 show attenuation characteristics of filters according to the invention.

Fig. 1 shows a schematic and simplified example of a receiver according to the invention. In this Figure 1 represents a suitable aerial system for the reception of a carrier wave modulated by the two said components. In addition, a second carrier wave will be received which, in frequency or in amplitude, is modulated by a sound signal. The aerial system 1 is coupled to a high frequency stage 2 and a mixer stage 3. The output signal of 3 is supplied to an intermediate frequency stage 4 which is coupled to a detector 5 and a video amplifier 6.

The carrier wave modulated by the sound signal, may be separated from the television signal in the intermediate frequency stage 4 or in the detector 5—making use or not of the intercarrier wave principle—and be supplied to an intermediate frequency stage 11 which in turn is coupled to a sound detector 12. The output signal of 12 is supplied to one or more loudspeakers 14 via a low frequency amplifier 13. In Fig. 1 the sound carrier wave is separated from the television signal in the intermediate frequency stage 4.

The transmitted television signal comprises at the same time the required synchronising signals both for the sawtooth generators for the horizontal and vertical deflection and for the oscillator which produces the voltages required for the synchronous detection procedure. The synchronizing signals for the horizontal and vertical deflection are recovered from the output signal of the video amplifier 6 in the separating circuit 7.

The synchronizing pulses for the vertical deflection are supplied to the device 8 to synchronise the sawtooth generator forming part of it; the output currents of 8 are supplied to the vertical deflection coils of the picture tube which coils are not shown in the figure.

The synchronising pulses for the horizontal deflection are supplied to the device 9 to synchronise the sawtooth generator forming part of it; the output currents of 9 are supplied to the horizontal deflection coils of the picture tube which coils are not shown in the figure either.

The devices 8 and 9 at the same time comprise the possibly required fly-wheel circuits, while in addition a direct voltage, which may serve as a high tension for the picture tube, may be obtained in a known manner from the flyback of the line sawtooth generator from device 9.

At the same time, the output signal of the video amplifier 6 is supplied to a delay line 15, and also to a band pass filter 16 which only passes the second component (with the exception of course of the frequencies of the luminance signal lying in the frequency range of this second component).

The delay line 15 serves to compensate the delays in the demodulation products of the auxiliary carrier wave modulated in quadrature occurring at the outputs of the filters which limit these demodulation products to the desired frequencies.

The output signal of the delay line 15 is supplied to a suppression filter 17. As is known, the frequency of the auxiliary carrier wave is chosen so that the disturbing influence of the second signal component on the first signal component is as small as possible, but yet it appears to be necessary to include a suppression filter for the second component in the channel of the first component.

The output signal of the band filter 16 is supplied to an amplifier 19, which is connected to a separating circuit 18, in which the synchronising signals for the synchronous detection are recovered from the output signal of the amplifier 19, and also to two synchronous detectors 20 and 21.

The synchronising signals for the synchronous detection, which occur at the output of the separating circuit 18, are supplied to an oscillator 10, at the output of which two voltages occur of the same frequency, but the phase of which is shifted 90° with respect to each other. Also these two voltages are supplied respectively to the synchronous detectors 20 and 21.

It is assumed that the output signal of the detector 20 comprises the signal with larger bandwidth (the I-signal) and that the output signal of the detector 21 comprises the signal with smaller bandwidth (the Q-signal).

Therefore, the synchronous detector 20 is connected to a low-pass filter 22 of comparatively large bandwidth, and the synchronous detector 21 is connected to a low-pass filter 23 of comparatively small bandwidth.

Before further describing these low-pass filters 22 and 23, the remaining part of the receiver will be described.

The output signals of 22 and 23 are supplied to a matrix network 25 forming three so-called color difference signals from these output signals. A color difference signal is a signal which, when added to the luminance signal, yields a signal which relates to a definite color component of the scene to be reproduced.

In the chosen example the combination with the luminance signal occurs in the picture tube 26 itself. For that purpose the output signal of the suppression filter 17, so the luminance signal, is supplied with negative polarity to the three interconnected cathodes 30 of the three-color-tube 26 provided with three electron guns.

By supplying at the same time the output signals of the matrix 25 to the three non-interconnected control grids 31, 32 and 33 respectively, each of the electron beams produced by the electron guns is modulated by the sum of the luminance signal and a color difference signal.

Fig. 2 shows the attenuation characteristics of the low-pass filters as used in the known receivers in the output circuits of the synchronous detectors 20 and 21. The attenuation A is plotted as a function of the frequency on a double logarithmic scale. Curve *a* represents the attenuation characteristic of the filter in the output circuit of the synchronous detector for the signal with larger bandwidth; curve *b* represents the attenuation characteristics of the filter in the output circuit of the synchronous detector for the signal with smaller bandwidth. $f_a$ represents the limit frequency of the filter for the signal with larger bandwidth; $f_b$ is the limit frequency of the filter for the signal with smaller bandwidth.

In the known receivers $f_a$ is approximately three times as large as $f_b$; the slopes of curves *a* and *b* are approximately equal.

Both slopes are comparatively steep. For the filter for the signal with larger bandwidth, this is the case to prevent that disturbances, originating from those modulation products of the synchronous detector that consist of the lower side band of the modulated auxiliary carrier wave should occur at the input of the matrix network 25. For the filter for the signal with smaller bandwidth, the slope is chosen comparatively steeply, in order to suppress—in the output signal of the demodulator for the signal with smaller bandwidth—those parts of the signal with larger bandwidth that are not reduced to zero in the synchronous detection in the demodulator for the signal with smaller bandwidth, that is to say the parts of the signal with larger bandwidth that are modulated on the auxiliary carrier wave by a single side band.

In connection with the fact that $f_a$ is approximately three times as large as $f_b$, the delay in the signal with larger bandwidth will be approximately three times as small as the delay in the signal with smaller bandwidth. In practice, the compensation of this difference in delay occurs by means of a delay line taken up in the channel for the signal with larger bandwidth.

Fig. 3 shows the attenuation characteristics of the low-pass filters according to the invention.

The slope of the attenuation characteristic *a'* of the filter in the output of the synchronous detector for the signal with larger bandwidth is chosen somewhat more steeply than the slope of the known filter; however this is no imperative condition for using the invention. The slope of the attenuation characteristic *b'* of the filter in the output of the synchronous detector for the signal with smaller bandwidth is considerably less steep, however. If the limit values $f_{a'}$ and $f_{b'}$ are chosen such that $f_{a'}$ is approximately three times as large as $f_{b'}$, the slope of the attenuation characteristic *b'* according to the invention is chosen about three times less steeply than the slope of the attenuation characteristic *a'*. The delays caused by the two filters will then be practically equal, so that it is not necessary to include an additional delay line in the channel for the signal with larger bandwidth.

Naturally, those parts of the signal with larger bandwidth, that were not reduced to zero in the synchronous detection in the demodulator for the signal with smaller bandwidth are now considerably less suppressed by the filter for the signal with smaller bandwidth.

Now it has appeared experimentally that the influence of these substantially disturbing components on the reproduction is considerably less great than is assumed in general.

Figure 4:
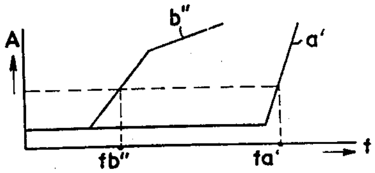

Fig. 4 shows an attenuation characteristic $b''$, in which the suppression of the above undesired components in the neighbourhood of $f_{b''}$ is stronger, but between $f_{b''}$ and $f_{a'}$ is less strong than that exerted by a filter the attenuation characteristic of which is given by curve $b'$. So the influence of the undesired components between $f_{b''}$ and $f_{a'}$ is larger than in a filter with attenuation characteristic $b'$; the influence in the direct neighbourhood of the desired components is smaller. Since in addition the amplitude of the undesired components decreases with increasing the frequency, the increased influence of these components between $f_{b''}$ and $f_{a'}$ is hardly perceptible, and it consequently appears that the results obtained with a filter with attenuation characteristic $b''$ are somewhat better than the results obtained with a filter with attenuation characteristic $b'$.

Figure 5:
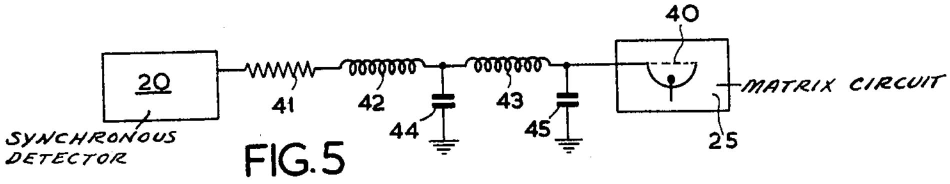
Figs. 5 and 6 are embodiments of filters according to the invention.
Figure 6:
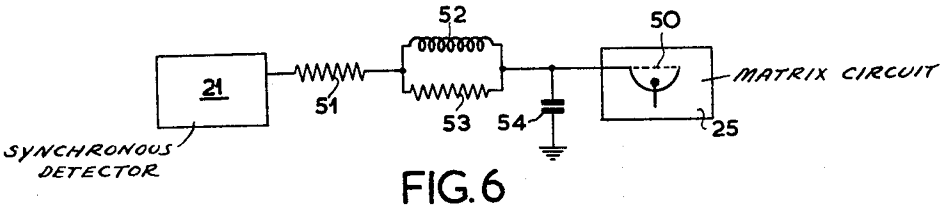

Figs. 5 and 6 are examples of filters 22 and 23 used in practice.

Fig. 5 shows the filter for the signal with larger bandwidth (the I-signal with a frequency band to 1500 kc./s.) 20 is again the demodulator for the signal with larger bandwidth; viewed as a signal source; this demodulator has an inner resistance of 6:8 kΩ. 40 represents an input electrode of an electron tube, which forms part of the matrix network 25. The resistor 41 has a value of 3:3 kΩ. The coils 42 and 43 have inductance values of 0.52 mh. and 1.76 mh. respectively. The capacity of capacitor 44 amounts to 10.4 pf., and the capacity of the capacitor 45 in which the input capacity across the relative input of the matrix network 25 is assumed to be included, amounts to 17.1 pf.

The attenuation characteristic $b''$ for the filter 23 for the signal with smaller bandwidth (the Q-signal with a frequency band to 500 kc./s) is realised by the network shown in Fig. 6. 21 is the demodulator for the signal with smaller bandwidth; viewed as a signal source; this demodulator has an inner resistance of 6.8 kΩ. 50 represents an input electrode of another electron tube, which forms part of the matrix network 25. The resistor 51 has a value of 3.3 kΩ. The inductance of coil 52 amounts to 1.68 mh. The value of resistor 53 is 16 kΩ and the capacity of the capacitor 54, in which the input capacity across the relative input of the matrix network 25 is again assumed to be included, amounts in this case to 28.2 pf.

The delay which is brought about by the filters according to Figs. 5 and 6 amounts in both case to 0.34 μsec.

What is claimed is:

1. A receiver for receiving color television signals of the type comprising a luminance signal component and a chrominance signal component comprising an auxiliary carrier wave modulated in quadrature with first and second signals of different bandwidth, said first signal having a larger bandwidth than said second signal, said receiver comprising first demodulator means connected to demodulate said first signal, second demodulator means connected to demodulate said second signal, first low-pass filter means connected to the output of said first demodulator means, and second low-pass filter means connected to the output of said second demodulator means, the ratio of the slope of said second filter means in the region of the cutoff frequency of said second filter to the slope of said first filter means in the region of the cutoff frequency of said first filter means being approximately equal to the ratio between the cutoff frequency of said second filter means and the cutoff frequency of said first filter means.

2. A receiver for receiving color television signals of the type comprising a luminance signal component and a chrominance signal component comprising an auxiliary carrier wave modulated in quadrature with first and second signals of different bandwidth, said first signal having a larger bandwidth than said second signal, said receiver comprising first demodulator means connected to demodulate said first signal, second demodulator means connected to demodulate said second signal, first low-pass filter means connected to the output of said first demodulator means, and second low-pass filter means connected to the output of said second demodulator means, the ratio of the slope of said second filter means in the region of the cutoff frequency of said second filter to the slope of said first filter means in the region of the cutoff frequency of said first filter means being approximately equal to the ratio between the cutoff frequency of said second filter means and the cutoff frequency of said first filter means, the slope of said second filter means in the immediate neighborhood of the respective cutoff frequency being steeper than the slope of said second filter means in the frequency range between the two said cutoff frequencies.

3. The receiver of claim 2, in which the slope of said second filter means in the immediate neighborhood of the respective cutoff frequency is steeper than said ratio.

References Cited in the file of this patent

UNITED STATES PATENTS

| | | |
|---|---|---|
| 2,831,919 | Lockhart | Apr. 22, 1958 |
| 2,925,462 | Pritchard et al. | Feb. 16, 1960 |